United States Patent Office 3,167,583
Patented Jan. 26, 1965

3,167,583
ETHYLENICALLY UNSATURATED DERIVATIVES
OF ORTHO-HYDROXY AROMATIC ACIDS
Albert I. Goldberg, Berkeley Heights, N.J., and Martin Skoultchi and Joseph Fertig, New York, N.Y., assignors to National Starch and Chemical Corporation, New York, N.Y., a corporation of Delaware
No Drawing. Filed Aug. 24, 1962, Ser. No. 219,112
9 Claims. (Cl. 260—473)

This invention relates to the preparation of novel ethylenically unsaturated derivatives of ortho-hydroxy aromatic acids and, more particularly, to ethylenically unsaturated esters of said ortho-hydroxy aromatic acids.

Polymers and copolymers prepared from ethylenically unsaturated derivatives of aromatic nuclei having hydroxy groups substituted ortho to said ethylenically unsaturated groups have a number of interesting properties which have prompted further investigation leading to the synthesis of additional vinyl monomers of this type. Thus, British Patent No. 807,198 reports on the preparation of polymers from both vinyl and allyl salicylate. The latter monomers are prepared by means of an ester exchange reaction whose general method is outlined in U.S. Patent No. 2,299,862 which in the case of vinyl salicylate, for example, calls for the reaction of salicylic acid with a large excess of vinyl acetate in the presence of catalytic amounts of mercuric acetate. Although this technique is fairly direct, it nonetheless requires a number of post-reaction separation procedures in order to be able to isolate the desired product from the large excess of unreacted vinyl acetate as well as from the acetic acid which is produced as a by-product.

U.S. Patent No. 2,961,426 discloses the ortho-acrylyl phenols and their subsequent use in the preparation of polymers. The latter monomers are, however, prepared by means of a rather lengthy and tedious three-step process involving esterification of a phenol with beta-chloropropionyl chloride, isomerization of the thus formed ester with aluminum cloride to the ortho-(beta-chloropropionyl) phenol followed by the dehydrohalogenation of the latter with sodium acetate, in alcohol, to give the desired ortho-acrylyl phenol. Needless to say, a process of such obvious complexity is not readily adaptable for commercial utilization.

It is the object of this invention to produce a novel class of ethylenically unsaturated derivatives of ortho-hydroxy aromatic acids, said derivatives being capable of undergoing vinyl type polymerization reactions either alone or in the presence of other vinyl type comonomers.

A further object of this invention involves the preparation of polymerizable derivatives of ortho-hydroxy aromatic acids which can be incorporated into a wide variety of polymers and copolymers so as to provide such polymers with sites for subsequent reaction with diazonium salts, the latter reaction thereby converting said polymers into integrally colored compositions.

An additional object of this invention relates to the preparation of ethylenically unsaturated derivatives of ortho-hydroxy aromatic acids which may be utilized as chelating agents as may also the polymers and copolymers which can be prepared from these derivatives.

A still further object is to prepare polymerizable derivatives which yield polymers and copolymers characterized by their improved resistance to the degradative effects of ultra-violet radiation.

The novel compositions of our invention are the ethylenically unsaturated derivatives of ortho-hydroxy aromatic acids which correspond to the formula:

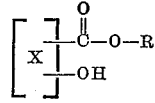

wherein X is a radical of the benzene series selected from among the group consisting of phenyl and naphthyl radicals having said hydroxy, i.e. —OH, and carboxy ester, i.e.

groups substituted thereon in positions which are ortho with respect to one another, and wherein R is an ethylenically unsaturated radical selected from among the class consisting of beta-hydroxypropyl acrylate, i.e.

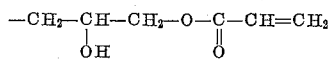

and beta-hydroxypropyl methacrylate, i.e.

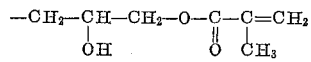

radicals.

The following list is representative of the ortho-hydroxy aromatic acid derivatives of our invention. For purposes of brevity, this list notes only the beta-hydroxypropyl acrylate derivatives; however, it is of course to be understood that the corresponding beta-hydroxypropyl methacrylate derivatives may also be prepared where so desired. One may thus list: 2-hydroxy-3-(2-hydroxy-benzoyloxy)propyl acrylate; 2 - hydroxy-3 - (1 - hydroxy-2-naphthoyloxy)propyl acrylate; 2-hydroxy-3-(2-hydroxy-3-naphthoyloxy)-propyl acrylate; and, 2-hydroxy-3-(2-hydroxy-1-naphthoyloxy)propyl acrylate.

Thus, it is to be seen that the compounds of our invention may be referred to as ethylenically unsaturated derivatives of ortho-hydroxy aromatic acids; or, more specifically, as the beta-hydroxypropyl acrylate and the beta-hydroxypropyl methacrylate esters of ortho-hydroxy aromatic acids.

All of the above listed compounds, as well as the others which correspond to the above described formula, are materials which are capable of readily undergoing vinyl type polymerization reactions. They are thus useful for the preparation of homopolymers and, more particularly, for the preparation of copolymers with other vinyl type monomers. Further details relating to the preparation of these polymers may be obtained in our copending application, Serial No. 228,021, filed Oct. 3, 1962, as assigned to the assignee of the subject application.

Such polymers and copolymers possess a rather useful and unusual property. Thus, we have found that they may be reacted with diazonium salts so as to provide these polymers with an integral or "built-in" color. In effect, by subjecting these polymers to the latter reaction, they are converted into what may be described as polymeric azo type dyes. Further details relating to the reaction, with diazonium salts, of polymers containing the derivatives of our invention may be found in our copending application, Serial No. 243,983, filed Dec. 12, 1962, and assigned to the assignee of the subject application.

Another useful property characteristic of the novel derivatives of our invention resides in the fact that they may be utilized as chelating agents, i.e. they may be used to remove or scavenge metallic ions from aqueous solutions or from solutions of water soluble organic solvents. Moreover, this same chelating ability is also displayed by the polymers and copolymers which may be derived from our ethylenically unsaturated ortho-hydroxy aromatic acids.

In addition, the polymers and copolymers derived from our novel derivatives are especially outstanding in regard to their superior light stability inasmuch as they tend to resist the degradative effects of ultra-violet radiation.

In brief, the synthesis of our novel derivatives is accomplished by means of a simple, one-step procedure involving the catalyzed reaction of an ortho-hydroxy aromatic acid intermediate together with either glycidyl acrylate or methacrylate. Thus, where glycidyl acrylate is utilized, the resulting derivatives are the beta-hydroxypropyl acrylate esters of their respective ortho-hydroxy aromatic acid intermediates; whereas, when glycidyl methacrylate is employed, the resulting derivatives are the beta-hydroxypropyl methacrylate esters of their respective ortho-hydroxy aromatic acid intermediates.

The ortho-hydroxy aromatic acid intermediates which are applicable for use in the process of our invention are compounds corresponding to the following formula:

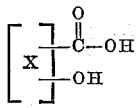

wherein X is a radical of the benzene series selected from among the group consisting of the phenyl and naphthyl radicals having said hydroxy, i.e. —OH, and carboxy, i.e.

groups substituted thereon in positions which are ortho with respect to one another.

As examples of the ortho-hydroxy aromatic acids which may be utilized as intermediates in our process, one may list:

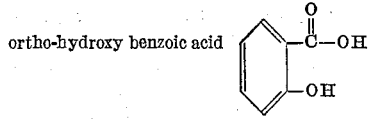
ortho-hydroxy benzoic acid

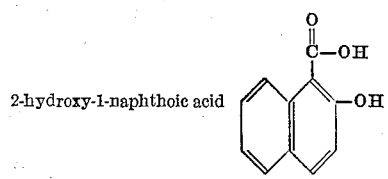
2-hydroxy-1-naphthoic acid

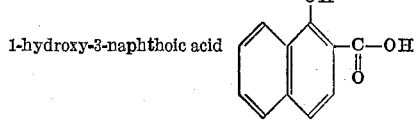
1-hydroxy-3-naphthoic acid and,

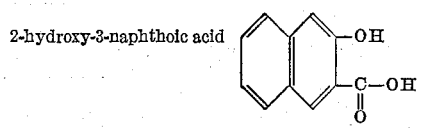
2-hydroxy-3-naphthoic acid

Hereinafter, it is to be understood that the use, for purposes of brevity, of the expression, "the ortho-hydroxy aromatic acid intermediate" is meant to include any of the above litsed intermediates as well as any others which may correspond to the above noted formula which was given to represent these intermediates.

In conducting the reaction which leads to the synthesis of our novel derivatives, the glycidyl acrylate or methacrylate, in a concentration amounting to a slight stoichiometric excess in the order of about 1 to 10% over the subsequently added ortho-hydroxy aromatic acid intermediate, is first ordinarily admixed with the selected catalyst. The latter may be chosen from among any of the group consisting of the alkali metal hydroxides, such as sodium hydroxide or potassium hydroxide; the salts of the alkali metals, such as sodium bicarbonate or sodium chloride; and, the quaternary ammonium halides, such as tetramethylammonium chloride or tetrabutylammonium iodide. These catalysts should be present in a concentration of about 0.1 to 5.0%, as based upon the weight of the glycidyl acrylate or methacrylate.

Following the initial preparation of the mixture comprising the catalyst and the glycidyl acrylate or methacrylate, there is then added, with continued agitation, the selected ortho-hydroxy aromatic acid intermediate. However, it should be emphasized that the use of this particular sequence is not critical to the process of our invention and may be altered by the practitioner to suit his particular needs. It is, in fact, possible to admix the reactants and the catalyst in any desired order. In any event, following the complete admixture of the ortho-hydroxy aromatic acid intermediate with the catalyst and the glycidyl acrylate or methacrylate, agitation is continued while the resulting reaction mixture is maintained at a temperature in the range of about 40 to 100° C., and preferably at about 70 to 75° C., for periods of about 2 to 12 hours. Under these conditions, the reaction between the ortho-hydroxy aromatic acid intermediate and the glycidyl acrylate or methacrylate will ordinarily proceed to a conversion in the range of about 70 to 95%.

In general, it should be noted that the preparation of the derivatives of our invention may be conducted at any temperature which will be high enough to result in an adequate reaction rate but which will not be so high as to cause the spontaneous polymerization of the resulting ethylenically unsaturated ortho-hydroxy aromatic acid derivative. In addition, the length of the reaction period will depend, for the most part, upon the specific ortho-hydroxy aromatic acid intermediate which is being utilized. Thus, it is a matter of simple experience and judgment on the part of the practitioner to determine the precise combination of time and temperature which will best be suited for the synthesis of any of the novel ortho-hydroxy aromatic acid derivatives coming within the scope of our invention.

Mention may be made at this time that in those cases wherein the ultimate ethylenically unsaturated ortho-hydroxy aromatic acid derivative is known to undergo spontaneous homopolymerization, there may also be added to the reaction mixture from about 0.001 to about 0.1%, as based upon the initial weight of the ortho-hydroxy aromatic acid intermediate, of a polymerization inhibitor such as benzoquinone or hydroquinone or its monomethyl ether.

Upon the completion of the reaction, and with subsequent cooling of the reaction vessel to room temperature, the resulting products will ordinarily be in the form of viscous liquids. For most purposes, including any subsequent polymerization reactions, this crude derivative can then be used without any further purification being necessary. However, where desired, the relatively small amount of unreacted ortho-hydroxy aromatic acid intermediate may be removed. Thus, such means as chromatographic separation techniques, as for example with the use of a silica gel column, have been found to yield a product which, by means of a saponification equivalent analysis, will indicate a purity of close to 100%. Other separation techniques, such as alkaline or organic solvent extraction procedures, may also be used where so desired by the practitioner.

It is also possible, if so desired, to prepare the novel derivatives of our invention by reaction in an organic solvent medium. Under these conditions, the ortho-hydroxy aromatic acid intermediate, the catalyst, and the ethylenically unsaturated reagent may all be dissolved in a non-reactive polar solvent, such as acetone, tetrahydrofuran, dimethylformamide, dimethylsulfoxide, methyl ethyl ketone, or butyl acetate. The resulting derivative is then recovered by distilling off the solvent whereupon the crude product may be purified by means of the above noted techniques.

The following examples will further illustrate specific embodiments of this invention. In these examples, all parts given are by weight unless otherwise noted.

Example I

This example illustrates the preparation of 2-hydroxy-3-(2-hydroxy-3-naphthoyloxy)propyl methacrylate, i.e.,

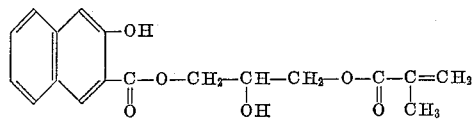

by means of the process of our invention.

An agitated mixture of 156.0 parts of glycidyl methacrylate, 188.0 parts of 2-hydroxy-3-naphthoic acid, and 3.2 parts of tetramethylammonium chloride was heated to a temperature in the range of 70–80° C. and maintained at this temperature for a period of 5 hours. Upon being cooled to 20° C., the resulting reaction product, which was in the form of a viscous liquid, was removed and subjected to a base titration. The latter analysis revealed that there was about 4% of unreacted 2-hydroxy-3-naphthoic acid present within this reaction product which thereby indicated a conversion of 93% or a yield of about 307 parts of 2-hydroxy-3(2-hydroxy-3-naphthoyloxy)propyl methacrylate.

Example II

This example illustrates the preparation of 2-hydroxy-3-(2-hydroxy-3-naphthoyloxy)propyl acrylate, i.e.

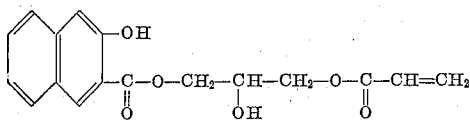

by means of the process of our invention.

An agitated mixture of 141.0 parts of glycidyl acrylate, 188.0 parts of 2-hydroxy-3-naphthoic acid, and 2.8 parts of sodium hydroxide was heated to a temperature in the range of 70–80° C. and maintained at this temperature for a period of five hours. Upon being cooled to 20° C., the resulting reaction product, which was in the form of a viscous liquid, was removed and subjected to a base titration. The latter analysis revealed that there was about 5% of unreacted 2-hydroxy-3-naphthoic acid present within this reaction product which thereby indicated a conversion of 91% or a yield of about 284 parts of 2-hydroxy-3-(2-hydroxy-3-naphthoyloxy)propyl acrylate.

Example III

The following table presents the pertinent data relating to the preparation of six additional ethylenically unsaturated ortho-hydroxy aromatic acid derivatives. In this table, derivatives #1 and 2 were prepared using salicylic acid as the ortho-hydroxy aromatic acid intermediate, derivatives #3 and 4 were prepared using 2-hydroxy-1-naphthoic acid as the ortho-hydroxy aromatic acid intermediate, and derivatives #5 and 6 were prepared using 1-hydroxy-2-naphthoic acid as the ortho-hydroxy aromatic acid intermediate. Moreover derivatives #1, 3 and 5 are beta-hydroxypropyl methacrylate esters of their respective ortho-hydroxy aromatic acid intermediates which were prepared by means of the procedure of Example I, whereas derivatives #2, 4 and 6 are beta-hydroxypropyl acrylate esters of their respective ortho-hydroxy aromatic acid intermediates which were prepared by means of the procedure of Example II.

| No. | Name | Parts O-Hydroxy Aromatic Acid Intermediate | Parts Glycidyl Methacrylate | Parts Glycidyl Acrylate | Percent Conversion | Yield (Parts by wt.) |
|---|---|---|---|---|---|---|
| 1 | 2-hydroxy-3-(2-hydroxybenzoyloxy)propyl methacrylate. | 138 | 156 | | 96 | 269 |
| 2 | 2-hydroxy-3-(2-hydroxybenzoyloxy)propyl acrylate. | 138 | | 141 | 85 | 226 |
| 3 | 2-hydroxy-3-(2-hydroxy-1-naphthoyloxy)-propyl methacrylate. | 188 | 156 | | 92 | 304 |
| 4 | 2-hydroxy-3-(2-hydroxy-1-naphthoyloxy)-propyl acrylate. | 188 | | 141 | 81 | 256 |
| 5 | 2-hydroxy-3-(1-hydroxy-2-naphthoyloxy)-propyl methacrylate. | 188 | 156 | | 93 | 307 |
| 6 | 2-hydroxy-3-(1-hydroxy-2-naphthoyloxy)-propyl acrylate. | 188 | | 141 | 85 | 268 |

| No. | Structural Formula |
|---|---|
| 1 | ![salicylate methacrylate structure] |
| 2 | ![salicylate acrylate structure] |
| 3 | ![2-hydroxy-1-naphthoate methacrylate structure] |
| 4 | ![2-hydroxy-1-naphthoate acrylate structure] |
| 5 | ![1-hydroxy-2-naphthoate methacrylate structure] |
| 6 | ![1-hydroxy-2-naphthoate acrylate structure] |

Example IV

This example illustrates the chelating ability of one of the novel derivatives of our invention.

A solution of 33 parts of 2-hydroxy-3-(2-hydroxy-3- naphthoyloxy)propyl methacrylate, whose preparation was described in Example I, was prepared in 100 parts of a 1:1 mixture of ethanol and water. To the latter solution, there was then added a solution of 20 parts of cupric acetate monohydrate in 100 parts of a 1:1 mixture of ethanol and water. A precipitate of a blue-green copper chelate was immediately formed. This precipitate was then filtered, washed with aqueous ethanol and dried. Repeated extraction of this solid with warm water did not produce any loss in weight thereby indicating that the copper was tightly bound in the form of a chelate. However, treatment with 6 N hydrochloric acid caused decomposition of the chelate to cupric chloride and the 2-hydroxy-3-(2-hydroxy-3-naphthoyloxy)-propyl methacrylate.

The importance of utilizing ortho- rather than meta- or para-hydroxy substituted aromatic acids as intermediates in the process of our invention, resides in the fact that the use of such meta- or para-hydroxy substituted intermediates would give rise to large amounts of undesirable difunctional derivatives, i.e., the derivatives would contain two ethylenically unsaturated groups. Such difunctional monomers are of considerably less interest than their comparable monofunctional monomers inasmuch as they do not possess any chelating ability and, of greater significance, on being polymerized they yield highly crosslinked polymers as opposed to the linear polymers which result from the polymerization of the monofunctional derivatives of our invention. In addition to being crosslinked, the polymers prepared from the difunctional derivatives produced from such meta- or para-hydroxy substituted aromatic acid intermedates no longer contain active sites for subsequent reaction with diazonium salts and would, moreover, no longer function as chelating agents.

Although the above disclosure is seen to encompass the reaction between glycidyl acrylate or methacrylate with an ortho-hydroxy aromatic acid having either phenyl or naphthyl nucleus, it is of course to be understood that ortho-hydroxy aromatic acids having phenyl or naphthyl nuclei which have been substituted, as for example with low molecular weight hydrocarbon groups, may also be utilized in preparing the derivatives of our invention.

It should be pointed out that although the process of our invention has been limited to the reaction of ortho-hydroxy aromatic acids with either glycidyl acrylate or methacrylate, it is to be noted that one may also, if desired, prepare comparable derivatives utilizing, as substitutes for the glycidyl acrylate or methacrylate, such reagents as allyl glycidyl ether, butadiene monoxide, glycidyl crotonate and glycidyl alkyl maleates as well as any other available epoxides having ethylenically unsaturated linkages.

Finally, it may be mentioned that as an alternate procedure for preparing the novel ethylenically unsaturated derivatives of our invention, one may react an ortho-hydroxy aromatic acid with epichlorohydrin so as to yield its chloro-hydroxypropyl ester which is then, in turn, reacted with the sodium or potassium salt of either acrylic or methacrylic acid in order to yield the desired beta-hydroxypropyl acrylate or methacrylate ester.

Summarizing, our invention is thus seen to provide the practitioner with a novel class of ethylenically unsaturated derivatives of ortho-hydroxy aromatic acids. Variations may be made in proportions, procedures, and materials without departing from the scope of this invention as defined in the following claims.

What is claimed is:

1. The ethylenically unsaturated derivatives of ortho-hydroxy aromatic acids which correspond to the formula:

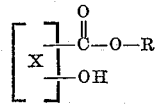

wherein X is a radical of the benzene series selected from the group consisting of phenyl and naphthyl radicals carrying said hydroxy and carboxy ester groups thereon in positions which are ortho with respect to one another, and wherein R is an ethylenically unsaturated radical selected from the class consisting of beta-hydroxypropyl acrylate and beta-hydroxypropyl methacrylate radicals.

2. 2-hydroxy-3-(2-hydroxy - benzoyloxy)propyl acrylate.

3. 2-hydroxy-3-(2-hydroxy - benzoyloxy)propyl methacrylate.

4. 2-hydroxy-3-(1-hydroxy - 2 - naphthoyloxy)propyl acrylate.

5. 2-hydroxy-3-(1 - hydroxy - 2 - naphthoyloxy)propyl methacrylate.

6. 2-hydroxy-3-(2 - hydroxy - 3 - naphthoyloxy)propyl acrylate.

7. 2-hydroxy-3-(2 - hydroxy - 3 - naphthoyloxy)propyl methacrylate.

8. 2-hydroxy-3-(2 - hydroxy - 1 - naphthoyloxy)propyl acrylate.

9. 2-hydroxy-3-(2 - hydroxy - 1 - naphthoyloxy)propyl methacrylate.

References Cited in the file of this patent
UNITED STATES PATENTS

| | | |
|---|---|---|
| 2,910,490 | Malkemus | Oct. 27, 1959 |
| 2,929,835 | Hayes et al. | Mar. 22, 1960 |
| 3,067,222 | Anderson | Dec. 4, 1962 |

OTHER REFERENCES

Hickenbottom: J. Chem. Soc., pages 4200–5 (1954).